(12) United States Patent
Wallstedt et al.

(10) Patent No.: US 6,466,793 B1
(45) Date of Patent: Oct. 15, 2002

(54) AUTOMATIC FREQUENCY ALLOCATION (AFA) FOR WIRELESS OFFICE SYSTEMS SHARING THE SPECTRUM WITH PUBLIC SYSTEMS

(75) Inventors: Yngve Kenneth Wallstedt, Chapel Hill; Lisa M. Lloyd, Pittsboro, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/322,623

(22) Filed: May 28, 1999

(51) Int. Cl.$^7$ .............................. H04Q 7/20; H04B 1/10
(52) U.S. Cl. .................... 455/450; 455/63; 455/444
(58) Field of Search .................. 455/450, 451, 455/452, 446, 447, 444, 464, 63, 62, 509, 422, 453, 454, 455; 370/252, 319, 341, 343, 344; 375/350, 346, 285, 348

(56) References Cited

U.S. PATENT DOCUMENTS

| | | | | |
|---|---|---|---|---|
| 3,660,765 A | * | 5/1972 | Glasser et al. | 455/247.1 |
| 5,323,447 A | * | 6/1994 | Gillis et al. | 455/411 |
| 5,675,629 A | | 10/1997 | Raffel et al. | |
| 5,737,359 A | * | 4/1998 | Koivu | 370/321 |
| 5,828,948 A | * | 10/1998 | Almgren et al. | 455/450 |
| 5,884,145 A | | 3/1999 | Haartsen | |
| 5,898,928 A | * | 4/1999 | Karlsson et al. | 455/450 |
| 5,963,865 A | * | 10/1999 | Desgagne et al. | 455/450 |
| 6,009,332 A | * | 12/1999 | Haartsen | 455/450 |
| 6,032,045 A | * | 2/2000 | Mimura | 455/446 |
| 6,078,812 A | * | 6/2000 | Mintz | 455/434 |
| 6,240,275 B1 | * | 5/2001 | H'Mimy et al. | 370/332 |
| 6,246,881 B1 | * | 6/2001 | Parantainen et al. | 455/450 |
| 6,256,477 B1 | * | 7/2001 | Eidson et al. | 455/63 |
| 6,351,643 B1 | * | 2/2002 | Haartsen | 455/444 |

OTHER PUBLICATIONS

System Design For An Autonomous IS–136 Personal Base Station, IEEE Vehicular Technology Conference, US New York, *IEEE*, vol. CONF. 46, Jarett, K. et al., Publication Date: Apr. 1996, ISBN: 0–7803–3158–3.

* cited by examiner

*Primary Examiner*—Vivian Chin
*Assistant Examiner*—Charles N. Appiah
(74) *Attorney, Agent, or Firm*—Coats & Bennett, P.L.L.C.

(57) ABSTRACT

A frequency allocation system automatically allocates which of select radio frequencies are to be used for wireless communication systems in a wireless office system having a plurality of transceivers using a pool of select radio frequencies. The system determines an interference level for each radio frequency. Radio frequencies having an interference level above a select threshold are abandoned. Remaining usable radio frequencies having the lowest interference levels are selected as allocated frequencies to be used as a pooled resource by any of the plurality of transceivers.

26 Claims, 6 Drawing Sheets

AUTOMATIC FREQUENCY ALLOCATION (AFA) FOR WIRELESS OFFICE SYSTEMS SHARING THE SPECTRUM WITH PUBLIC SYSTEMS

FIELD OF THE INVENTION

This invention relates to wireless office systems and, more particularly, to an automatic frequency allocation method and system.

BACKGROUND OF THE INVENTION

A wireless communication system, in the form of a cellular system, is designed to cover a large geographic area. The system is divided into numerous cells providing air interface between mobile stations and land-based systems. Each cell includes a base station for communicating with mobile stations. These wireless communication systems maintain a set of frequencies that are used for traffic channels and control channels. Frequency planning is necessary in order to determine which of the frequencies should be used at any given time. Automatic frequency allocation algorithms assign specific frequencies to each base station to provide efficient service.

Recently, cellular based system design is used as a foundation for smaller systems, such as wireless office systems (WOS). These wireless office systems may share the spectrum with the public cellular systems, also referred to as outdoor systems. Being smaller in scale than a public cellular system, a wireless office system utilizes less extensive processing systems. A WOS uses lower powered transceivers in radio heads for communicating in a localized area. The radio heads can also be considered as base stations. Cellular system frequency planning schemes are often not suitable for the smaller wireless office systems. Frequencies are not assigned to a transceiver or radio head. Instead frequencies are allocated by the WOS. The frequencies are a pooled resource common for all transceivers and base stations in the WOS. Thus, a mobile station operating in a WOS may retain the same frequency even after being handed off to a different transceiver in another base station. The mobile station need not re-tune.

Frequency planning of aWOS has to take into consideration several conflicting goals. These include that the system should not disturb the external public systems, the system should always have available operating frequencies and operation and maintenance should be simple.

The present invention is directed to overcoming one or more of the problems discussed above in a novel and simple manner.

SUMMARY OF THE INVENTION

In accordance with the invention an adaptive frequency allocation system and method allocates the least interfered frequencies to be frequencies for use as pooled resources and prevents use of frequencies that potentially interfere with other systems.

Broadly, there is disclosed herein a method for automatically allocating which of available radio frequencies are to be used as a pooled resource for wireless communications in a wireless office system having a plurality of transceivers using the pooled frequencies. An interference level is determined for each radio frequency. Any radio frequency having an interference level above a select threshold is abandoned. Remaining usable radio frequencies having the lowest interference levels are selected as allocated frequencies to be used as pooled resources by any of the plurality of transceivers in the wireless office system.

It is a feature of the invention that received signal strength is measured for each of the radio frequencies. An interference level is determined only for idle radio frequencies.

It is another feature of the invention to filter the interference values. Particularly, filtered interference values are determined using low pass filters with short and long time constants. Radio frequencies are abandoned if they have filtered interference values above a select threshold. Radio frequencies having the lowest filtered interference values are selected as allocated frequencies.

It is another feature of the invention that the radio frequency is abandoned for a time period dependent on amount the interference value is above the select threshold. The time period is lengthened if the interference value remains above the select threshold after the channel frequency is abandoned.

It is still another feature of the invention that allocated frequencies are replaced with other usable radio frequencies only if the interference value for the allocated frequency is above an acceptable interference threshold.

It is still an additional feature of the invention that allocated frequencies are replaced only with other usable channel frequencies having lower interference values.

It is yet another feature of the invention that select ones of the allocated frequencies are designated as candidates for use as control channel frequencies. A serving control channel is periodically rotated among the candidates. The candidates are selected from the allocated frequencies having the lowest interference values. The serving control channel is rotated in a round robin manner.

It is disclosed in accordance with another aspect of the invention an automatic frequency allocation system in a wireless office system. The system includes measurement means for determining an interference level for each of a plurality of available radio frequencies. A plurality of transceivers communicate with mobile stations using any of allocated radio frequencies. A frequency allocator is operatively connected to the measurement means and the plurality of base stations and includes first logic means for abandoning any radio frequency having an interference level above a select threshold. Second logic means select remaining usable radio frequencies having the lowest interference levels as allocated frequencies to be used as a pooled resource by any of the plurality of transceivers.

More particularly, an adaptive frequency allocation system and method finds and maintains a set of frequencies for the wireless office system to use for traffic channels and control channels. These allocated frequencies are a pooled resource common for all the transceivers and base stations in the wireless office system. The method and system allocates the least interfered frequencies to the allocated frequencies, and prevents the wireless office system from using frequencies that potentially interfere with other wireless communication systems by removing such frequencies from the allocated frequencies. Received signal strength measurements are used to monitor idle frequencies. Bit error rate and receive signal strength measurements are used to monitor busy frequencies.

Further features and advantages of the invention will be readily apparent from the specification and from the drawings.

DETAILED DESCRIPTION OF THE INVENTION

Figure 1:
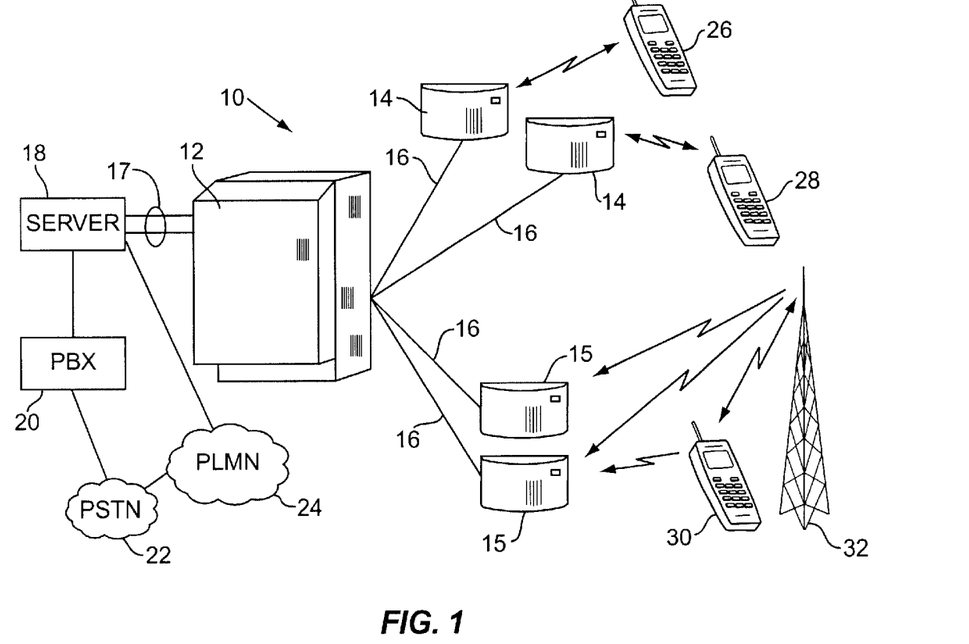
FIG. 1 is a generalized block diagram of a wireless communication system using the adaptive frequency allocation according to the invention.

Referring to FIG. 1, a generalized block diagram illustrates a wireless communication system in the form of a wireless office system (WOS) 10 that uses an adaptive frequency allocation (AFA) system and method in accordance with the invention. The WOS 10 shares the frequency spectrum with outdoor or public cellular systems.

The WOS 10 includes a cellular radio exchange 12 connected to a plurality of radio heads or base stations 14, two of which are shown, and to a plurality of scanners 15, two of which are shown, via cables 16. A typical WOS might include as many as thirty-two radio heads 14 and two to four scanners 15. The exchange 12 is connected via lines 17 to a mobility server 18 which is in turn connected to a private branch exchange (PBX) 20. The PBX 20 receives calls from, and sends calls to, the public switch telephone network (PSTN) 22. The mobility server 18 is also connected to the public land mobile network (PLMN) 24. Thus, the exchange 12 controls and coordinates the wireless connections among the plurality of radio heads 14 and various wireless communication devices, represented by mobile stations 26, 28 and 30 and the PSTN 22 or PLMN 24. The mobile stations are intended to communicate directly with a cellular public network, as illustrated by the mobile station 30 in communication with a cellular base transceiver station (BTS) 32, which is part of the PLMN 24.

To facilitate understanding of terms used throughout herein, the following definitions are provided:

| | |
|---|---|
| AFA | The Adaptive Frequency Allocation function that finds and maintain the Allocated Frequencies. |
| Allocated Frequencies | The set of frequencies that the WOS currently uses for call traffic and DCCH (the pool of frequencies). |
| Barred Frequencies | Frequencies that the operator has manually defined as barred. They can't be used by WOS. |
| BER | Bit Error Rate |
| BTS | Base Transceiver Station |
| CRE | Cellular Radio Exchange (12), a physical node in the WOS system. The CRE is the central node in the radio infrastructure. Most of the filtering and functions for AFA are located in the CRE. |
| DCCH | Digital Control Channel |
| DTC | Digital Traffic Channel |
| FastLPISH | ISH filtered in a low pass filter with short time constant. |
| Interfered Frequencies | Frequencies that are temporarily abandoned due to external interference. They can't be used by the WOS before a preset time has expired. |
| ISH | Interference value from a Scanner. |
| POF | Private Operating Frequency |
| RH | A Radio Head has plural transceivers (TRXs) for communicating with mobile stations and an uplink scanning receiver, and may be connected to the CRE via Cat 5 cable. |
| RSS | Received Signal Strength |
| RSSI | Received Signal Strength Indicator |
| Scanner | The Scanner 15 contains dedicated uplink and downlink-scanning receivers measuring received signal strengths (RSS) for use by AFA. |
| Selectable Frequencies | Frequencies that are currently not in the Allocated Frequencies but could be selected to the Allocated Frequencies. |
| SlowLPISH | ISH filtered in a low pass filter with long time constant. |
| Usable Frequencies | The union of the Allocated and Selectable Frequencies. These frequencies are acceptable for use by the WOS. |

For wireless cellular communications, numerous radio frequencies are available for use by both the WOS 10 and the PLMN 24. The PLMN 24 allocates select frequencies to each BTS 32, as is known. The WOS 10, in accordance with the invention, uses the AFA function to allocate select frequencies to be used as a pooled resource. As a result, plural radio heads 14 can communicate on the same frequency at the same time given that they do not interfere with each other.

The AFA function disclosed herein is designed to satisfy numerous requirements to achieve the conflicting goals discussed above. Particularly, the AFA function is adapted to always operate on the least interfered frequencies and to minimize disturbance to external systems. The AFA function tries to have a sufficient number of frequencies in an allocated frequency set. If not, then an alarm can be generated. When an interference changes, such as after a public system retunes, the AFA function adapts quickly. All frequencies are evaluated on a similar basis to avoid bias. Downlink is the most interfered link and is therefore measured at least as carefully as uplink. When an external radio environment is stable, the AFA function is also stable and does not change frequencies. The AFA function is applied both to DCCH and DTC frequencies. The number of parameters to be set for customers is minimized. A minimum number of absolute thresholds is used. Instead, the AFA function utilizes the least interfered frequencies, rather than absolute interference levels. The relative value of a measured frequency is much less dependent on the placement and performance of the measured devices than when using an absolute measurement. In order to satisfy these requirements, the architecture of the wireless office system 10 includes dedicated uplink/downlink scanners feeding AFA algorithms with appropriate measurements.

The cellular radio exchange 12, in accordance with the invention, comprises a programmed processing system. The processing system is conventional in nature and includes a central processing unit, such as a microprocessor or digital signal processor, and associated memory, as is well known and is therefore not specifically shown herein. The AFA function implemented in the processing system collects and filters RSS measurements taken from the scanners 15 and uses algorithms for making frequency allocation decisions based on these filtered measurements. The algorithm is operated to remove frequencies from and reestablish these frequencies to an allocated frequency set. The allocated frequency set is then used as a pooled resource by transceivers in the radio heads 14.

Figure 2:
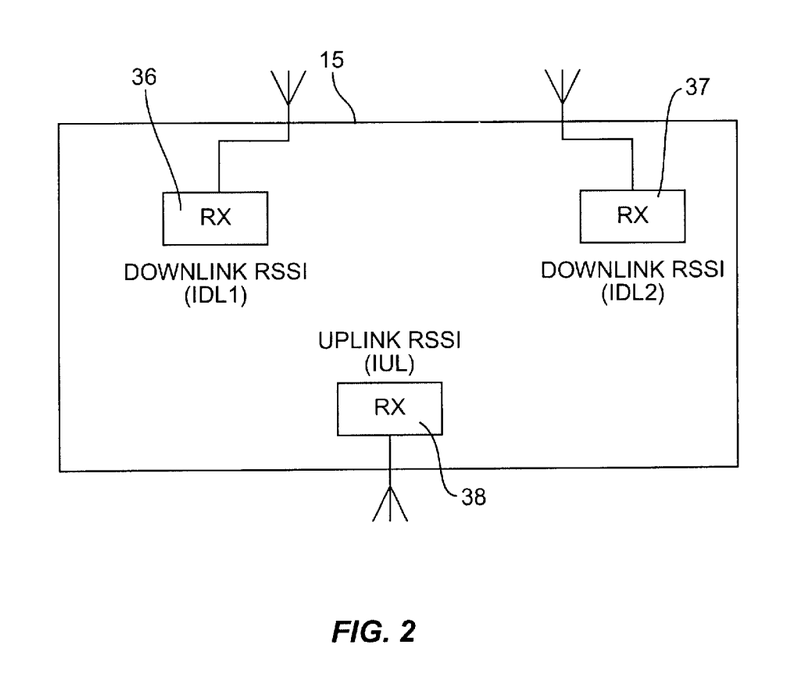
FIG. 2 is a block diagram of the scanner of FIG. 1.

The scanner 15 includes three scanning receivers 36, 37, and 38, see FIG. 2. The scanning receiver 38 is for uplink reception, while the scanning receivers 36 and 37 are for downlink reception. Two downlink receivers are utilized for diversity. These receivers 36, 37 and 38 scan the WOS operating frequency band for use by the AFA function. Each of the three receivers 36,37 and 38 measures RSS on up to 502 frequencies, which is the maximum size of a frequency band, i.e., 1900B. During a scanning cycle each receiver 36, 37 and 38 obtains enough samples for a frequency to correctly measure a single unsynchronized external mobile. It takes a scanner 15 less than twenty seconds to perform a measurement cycle of up to 502 frequencies. A programmable scan time value is therefore selected to be on the order of twenty seconds.

A minimum of two scanners 15 is recommend to protect the WOS 10 in the unlikely event that one fails.

Each scanning receiver 36–38 reports a respective interference value, IDL1,IDL2, and IUL, on each frequency in the operating frequency band to the CRE 12. The interference value ISH represents the maximum of the value IUL from the uplink receiver 38 and the values IDL1 and IDL2 from the respective downlink receivers 36 and 37. When all scanners 15 have reported to the CRE 12, the CRE 12 has the number of scanned frequencies times the number of scanners of fresh ISH values. At the same time, the CRE 12 tracks which frequencies have been in use during the scanning cycle and only ISH values for frequencies that have been idle during the cycle are retained. These are referred to as idle-ISH values. For each scanner 15, the CRE 12 feeds the idle-ISH values into different filters. A first low pass filter has a short time constant. This value may be, e.g., on the order of 40 seconds. A second low pass filter has a long time constant on the order of, e.g., one hour. The filter values are not updated for frequencies that have been busy during the scanning cycle. The output from the first low pass filter is referred to herein as FastLPISH, and the output from the second low pass filter is referred to herein as SlowLPISH. As is apparent, other types of filters and time constants can be used.

Figure 3:
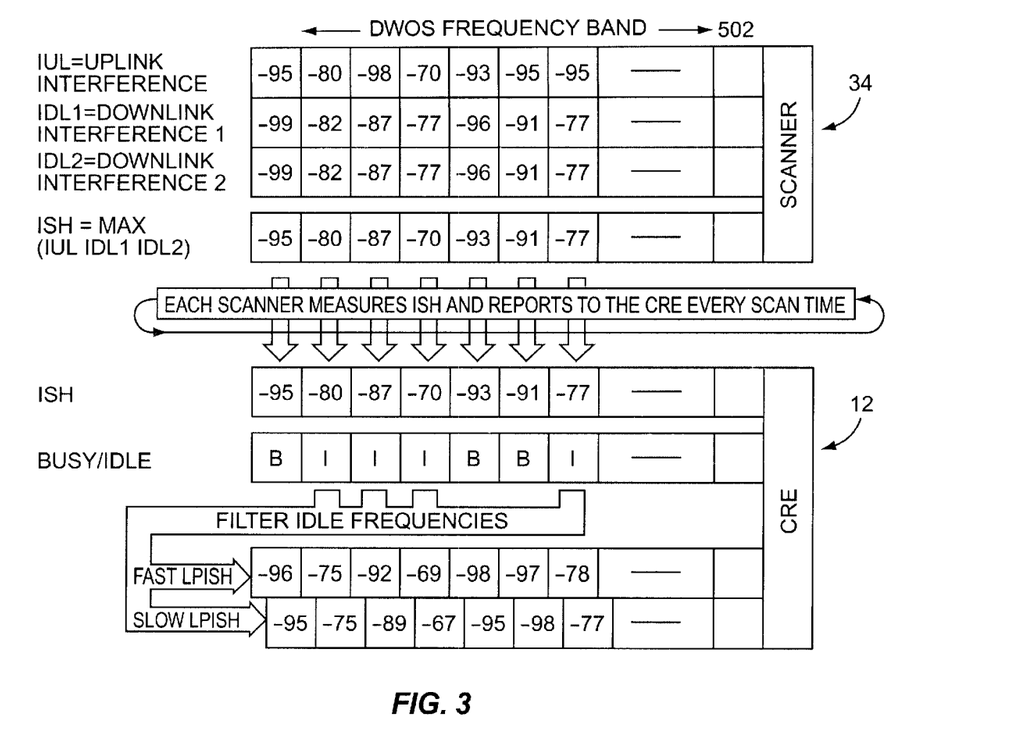
FIG. 3 is a graphical representation of a measurement function implemented in the system of FIG. 1.

As shown in FIG. 3, the CRE 12 has a matrix of fields with the interference measurements discussed above. Each frequency field has an ISH, a SlowLPISH and a FastLPISH value.

Figure 4:
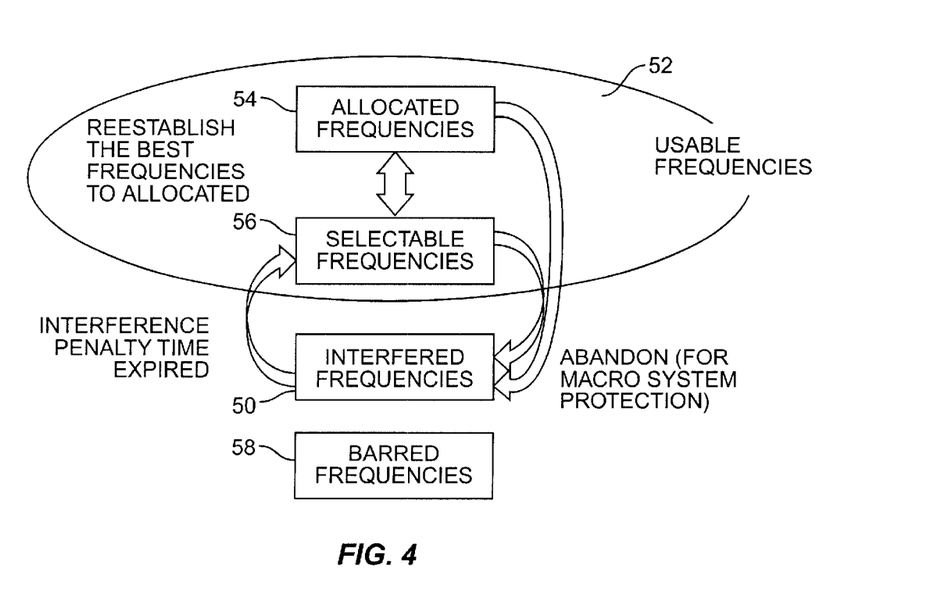
FIG. 4 is a state diagram illustrating frequency states and transitions between states.

The AFA function utilizes an algorithm that consists of two parts. Referring to FIG. 4 the first part removes interfered frequencies, represented as a set 50, from the usable frequencies, represented as a set 52. The usable frequencies comprises the union of allocated frequencies, represented as a set 54, and selectable frequencies, represented as a set 56. The second algorithm reestablishes the best selectable frequencies into the allocated frequency set 54. The reaction time to abandon a frequency when interfered is much shorter than the time to reestablish a frequency after interference has ceased. Certain of the frequencies may be designated as barred frequencies, as represented as a set 58. Additionally, a fixed set of frequencies can be manually allocated to the allocated frequency set 54, including the DCCH. These frequencies are non-volatile. The manual frequency allocation is not part of the present invention. The adaptive frequency allocation in accordance with the invention is described more particularly below.

The AFA function checks for interference from outdoor systems to avoid the use of interfered frequencies. At regular periods, referred to as a time to react, the FastLPISH values on all frequencies in the operating frequency range are evaluated. The time to react may be on the order of, e.g., 40 seconds. Interfered frequencies are temporarily abandoned. A timer is set depending on the interference value. The timer value indicates how long it will be before an interfered frequency will be selectable again. The timer value is decremented regularly.

Figure 5:
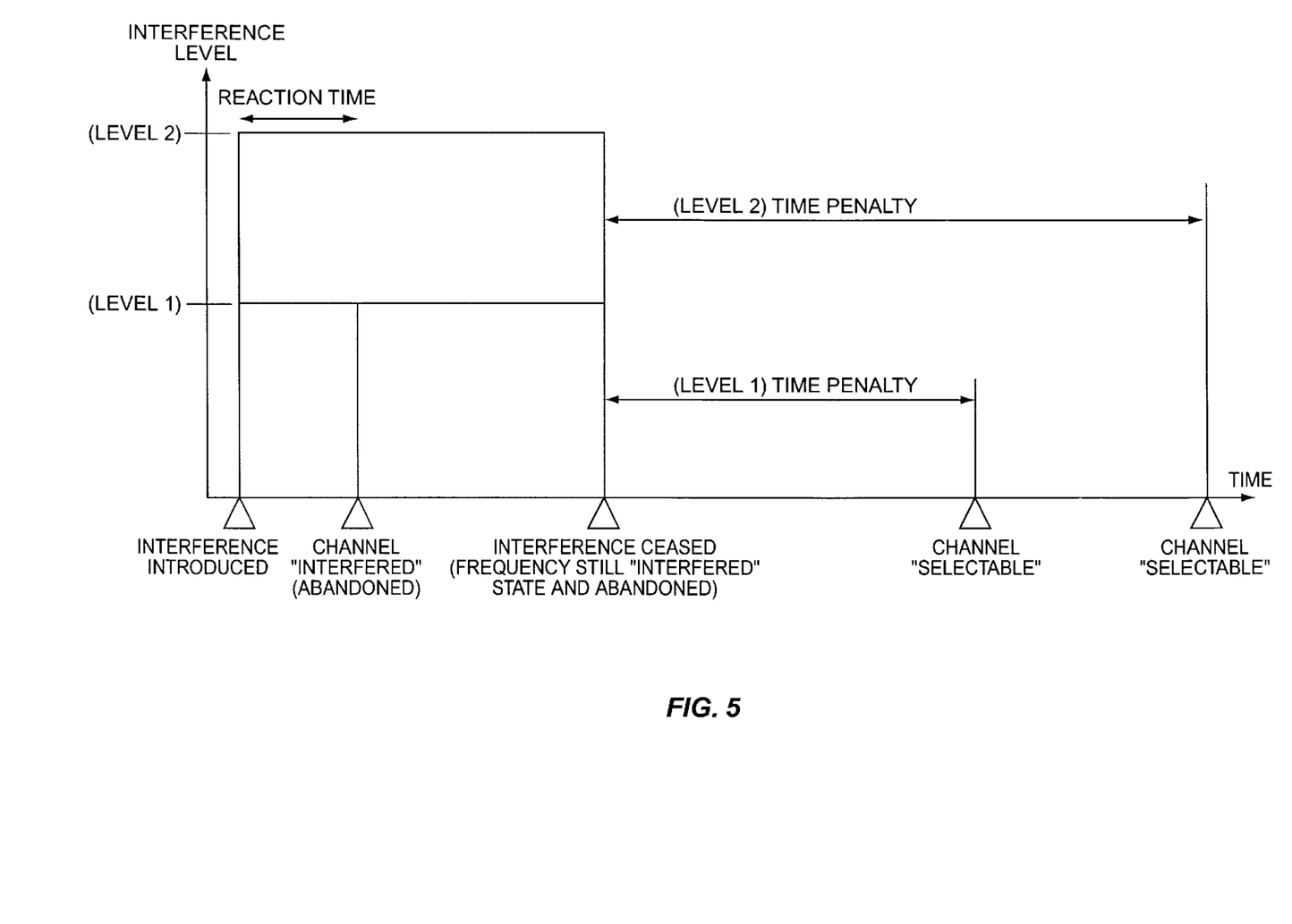
FIG. 5 is a timing diagram illustrating an example of abandoning and reestablishment of frequencies in accordance with the invention.
Figure 6:
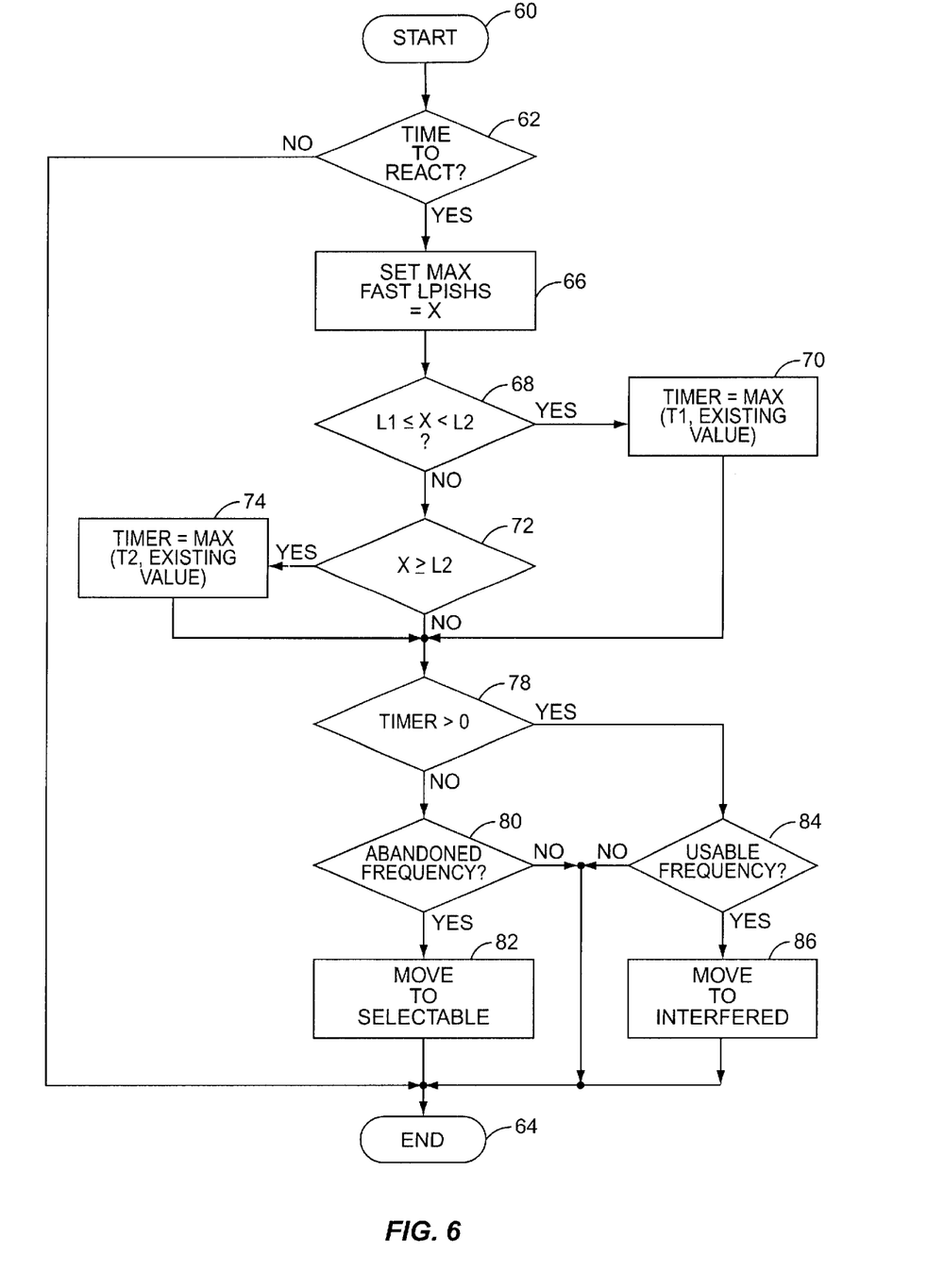
FIG. 6 is a flow diagram illustrating a logic sequence for abandoning idle traffic frequencies.

Referring to FIG. 6, a flow diagram illustrates a logic sequence implemented in the CRE 12 for abandoning idle frequencies. From a start node 60, a decision block 62 determines if a time to react period has been reached. If not, then the logic proceeds to an end node 64. If it is a time to react, then a block 66 takes the maximum FastLPISH value from all scanners for each idle frequency and stores each value as a variable X. If the maximum FastLPISH value is larger than a two different threshold levels L1 and L2, see FIG. 5, then it has exceeded an interference threshold and a timer will be updated. The timer is used to indicate when an interfered frequency is again available for use. The timer is decremented in a normal manner, unless an interference condition remains, as described below.

A decision block 68 determines if the value X is greater than or equal to the level 1 threshold L1 and less than the level 2 threshold L2. If so, then a timer is set to a maximum of a first time penalty value T1 or the current timer value at a block 70. If the conditions of the decision block 68 are not met, then a decision block 72 determines if the value X is greater than or equal to L2. If so, then the timer is set to a maximum of a second time penalty value T2 or the current timer value at a block 74. If not, indicating that the maximum FastLPISH value is not larger than either threshold, then the timer remains at its current value. From any of the blocks 70, 72, or 74, a decision block 78 determines if the timer value is greater than 0. If not, then a decision block 80 determines if the particular frequency is presently indicated as an abandoned frequency. If so, then it is moved to the selectable frequency set 56 at a block 82 and the routine ends. If the timer value is greater than 0, as determined at decision block 78, then a decision block 84 determines if the particular frequency is presently a usable frequency. If not, then the routine ends. If so, then the frequency is moved to the interfered frequency set 50 at a block 86 and the routine ends. As is apparent, if the frequency is not moved to another set then it retains its previous state, but the delay time can be updated.

In accordance with the invention, the first threshold L1 may be on the order of −105 dBm and the second threshold L2 may be on the order of −88 dBm. The first time penalty T1 may be on the order of 45 minutes, while the second time penalty T2 may be on the order of 7 hours. These values are illustrated for example only, and the particular values used may be determined according to requirements of the particular system. Also, more or less than two sets of thresholds and time penalty values can be used.

Thus, utilizing the logic sequence of FIG. 6, if a frequency has a timer value greater than zero and is in the usable frequency set 52, see FIG. 4, then it is moved to the interfered frequency set 50. This will initiate forced intra-radio head handoffs if the frequency is in the allocated frequency set 54 and is busy. An anomaly is reported if the size of the allocated frequency set 54 is less than a minimum size allocated set since the WOS system 10 capacity may be reduced. With this logic sequence the timer value is continually updated if the frequency is barred or interfered, as illustrated in FIG. 5. This means that the time period is lengthened if interference is detected after the frequency has been abandoned. In other words, the frequency is not returned to the selectable frequency set 56 until the select time period, T1 or T2, after the maximum FastLPISH value is less than the respective threshold L1 and L2.

As discussed above, scanner measurements are not used on frequencies that are currently in use in the wireless office system 10. Instead, the AFA function indirectly uses the intra-radio head handoff triggered by high BER. On each ongoing call, BER and RSSI are monitored for uplink and downlink. If BER exceeds a threshold at the same time that RSSI is better than another threshold, an intra-RH handoff is done to the least interfered DTC on another frequency in the allocated frequency set 54. If the call leaves the traffic frequency, then the frequency is idle and measured on by the scanners and will be abandoned if it is still interfered with in accordance with the logic sequence of FIG. 6.

Figure 7:
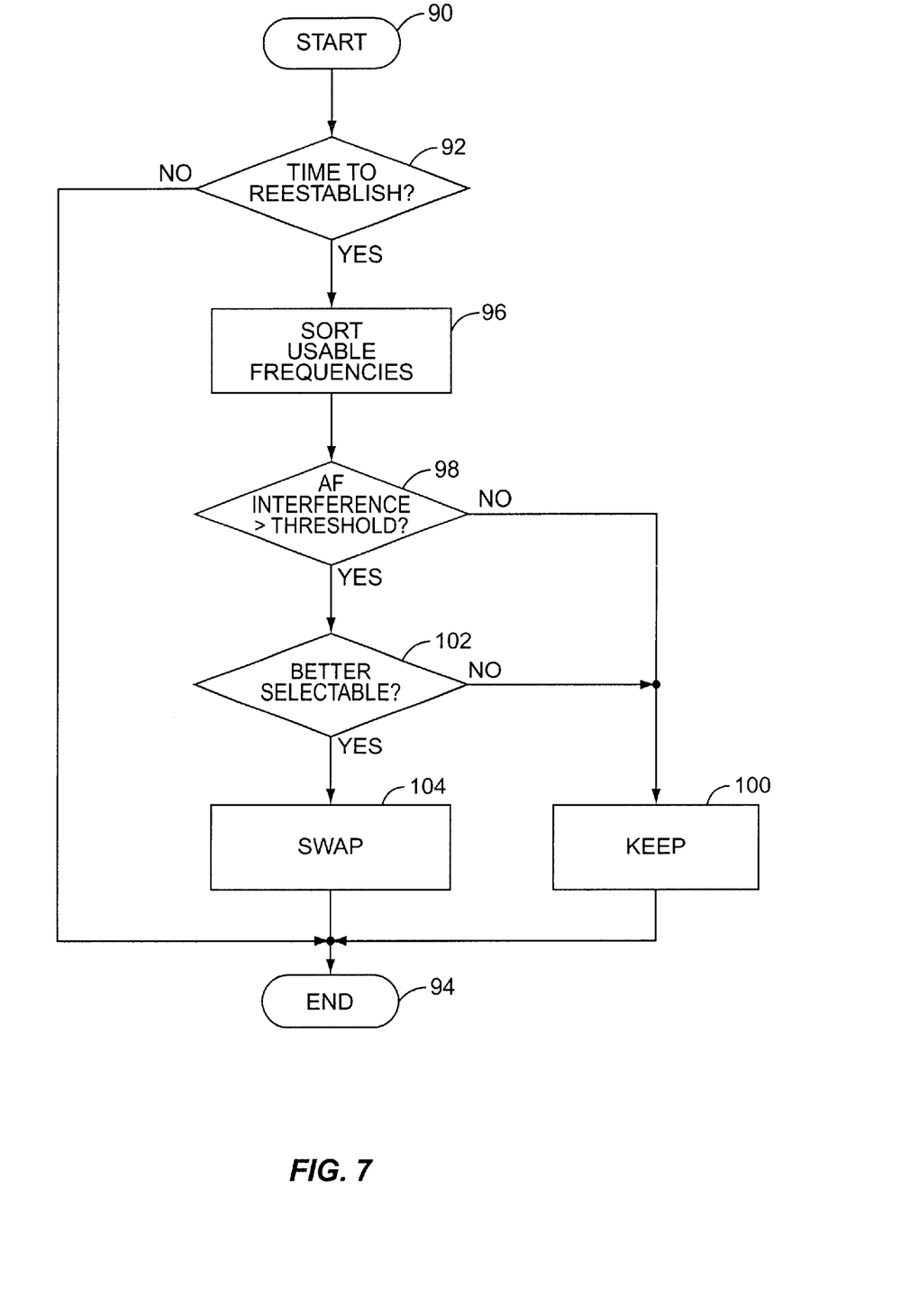
FIG. 7 is a flow diagram illustrating logic sequence for reestablishing frequencies in aaccordance with the invention.

Periodically, at a time referred to as time to reestablish, the least interfered frequencies are reestablished to the allocated frequencies set 54. The time to reestablish may be on the order of, e.g., thirty minutes. The flow diagram of FIG. 7 illustrates a logic sequence for reestablishing frequencies. From a start node 90, a decision block 92 determines if it is a time to reestablish. If not, then control proceeds to an end node 94. If so, then at a block 96 the usable frequencies, i.e., the allocated and selectable frequencies, are sorted based on the maximum SlowLPISH values of all scanners. A decision block 98 compares the maximum SlowLPISH value from the current allocated frequency set 54 with an acceptable interference threshold. The acceptable interference threshold maybe, e.g., on the order of −110 DBM. Allocated frequencies with an interference value lower than the threshold are considered good enough and are not replaced. This reduces unnecessary system response due to small changes in external interference. At best, if the interference value is not greater than the threshold, then any such frequency is kept as an allocated frequency at a block 100 and the routine ends. If the interference value is greater than the threshold, then a decision block 102 determines if there are sufficiently better frequencies found among the selectable frequencies. This algorithm uses hysteresis to avoid replacing allocated frequencies with marginally better selectable frequencies. Frequencies in the allocated frequency set 54 may be swapped out for better frequencies, which could resulted in forced intra-RH handoffs. The number of frequencies swapped out on a single evaluation may be limited. If there is a better selectable frequency, then the frequencies are swapped at a block 104 and the routine ends.

The CRE 12 has no valid measurements from scanners 34 on the current DCCH frequency because the DCCH frequency is always busy. In accordance with the invention, the CRE 12 rotates the serving DCCH among a number of frequencies, referred to as the DCCH candidates. The allows the CRE 12 to measure all frequencies on a more equal basis. The DCCH candidates are always part of the allocated frequency set 54.

The serving DCCH is rotated with a DCCH candidate at a DCCH swap time if swapping is enabled. If a DCCH candidate has been removed from the allocated frequency set 54 by the normal abandoning procedure, see FIG. 6, then a new candidate DCCH is reselected and is put last in a round robin list. The DTC frequencies having the lowest SlowLPISH value are reselected for the DCCH candidates. That candidate DCCH has to wait the longest time to become the serving DCCH, which increases the probability that the mobiles are always up to date with the POF, as defined in the TIA IS-136 air interface standard, used as the DCCH in the wireless office system 10.

The DCCH candidates are in the WOS's neighbor cell messages broadcast on the DCCH list of preferred neighbors. The mobile stations, such as the mobile station 26, will then regard the candidate DCCH's as POFs. This might minimize the risk of a terminal not finding the WOS due to a DCCH retuned to a frequency not stored as a POF in the mobile station.

Figure 8:
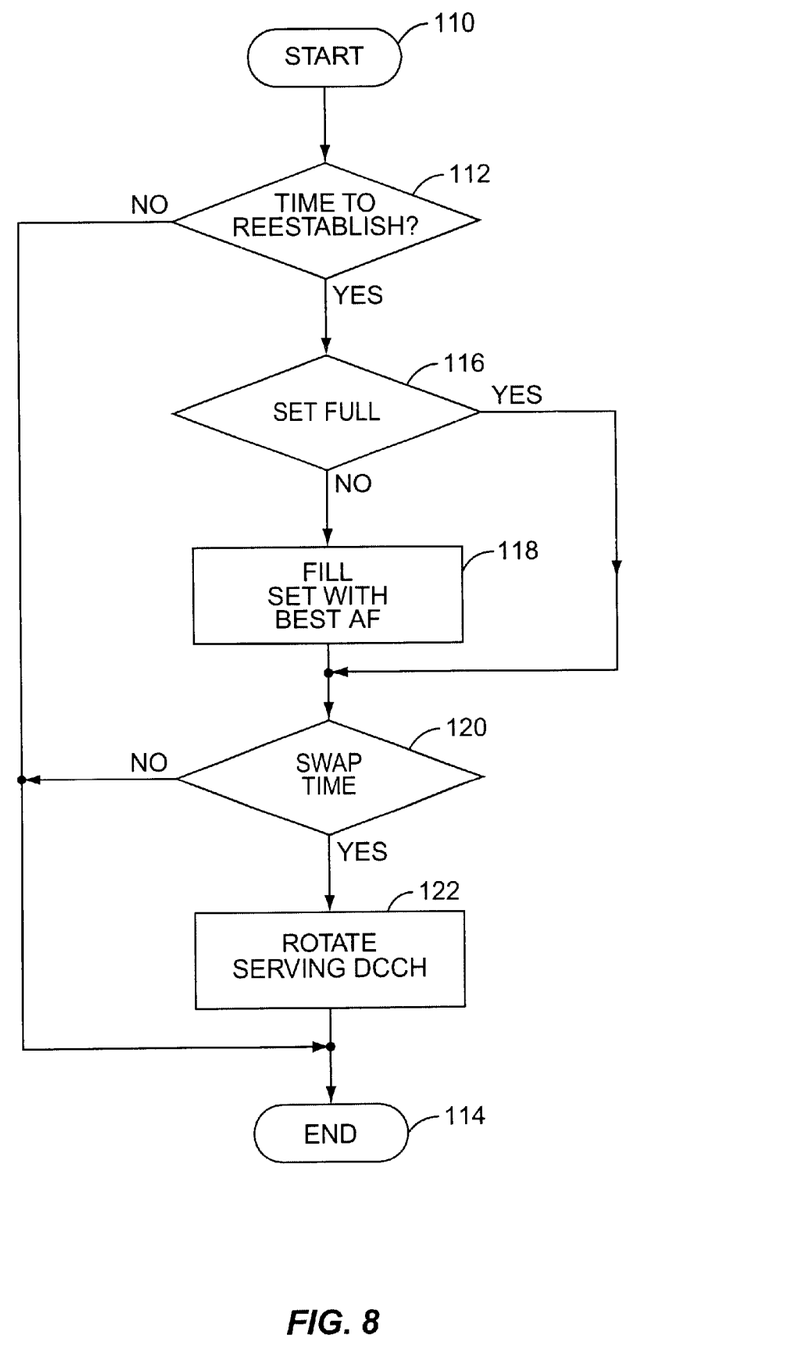
FIG. 8 is a flow diagram illustrating a logic sequence for selecting and removing control channel frequencies and candidates in accordance with the invention.

Referring to FIG. 8, a flow diagram illustrates a logic sequence for the adaptive algorithm for selecting and removing the DCCH frequency and DCCH candidates. The logic begins at a start node 110. A decision block 112 determines if it is a time to reestablish. If not, then control proceeds to an end node 114. If so, then a decision block 116 determines if the DCCH candidate set is full. If a DCCH candidate was abandoned, as discussed above, or if for any other reason the set is not full, then the set is filled with the least interfered allocated frequency at a block 118. A decision block 120 then determines if it is a DCCH swap time. If not, then the routine ends. If so, then a block 122 rotates the serving DCCH with a candidate DCCH from the candidate set in a round robin manner. The routine then ends. This rotation forces intra-RH handoffs on other time slots of the old DCCH frequency, and is needed only if there are no idle transmitters on a radio head 14 and the radio head 14 doesn't already have a transmitter tuned to the new DCCH frequency. If there is a call on the first time slot on the new DCCH frequency, then an intra-RH handoff is done to clear that time slot.

The candidate DCCH frequencies, including serving DCCH frequencies, are included in the WOS's neighbor cell list as preferred neighbors. The neighbor's cell list is kept up to date with changes in the DCCH candidate frequencies.

Thus, in accordance with the invention, the AFA function allocates least interfered frequencies to an allocated frequency set and prevents the wireless office system from using frequencies that potentially interfere with other systems by removing such frequencies from the allocated frequency set.

We claim:

1. A method for automatically allocating which of available radio frequencies are to be used as a pooled resource for wireless communications in a wireless office system having a plurality of transceivers using the pooled frequencies, the method comprising the steps of:

determining an interference level for each available radio frequency;

abandoning any radio frequency having an interference level above a select threshold;

selecting remaining usable radio frequencies having the lowest interference levels as allocated frequencies to be used in any of the plurality of transceivers in the wireless office system; and     wherein the abandoning step abandons the radio frequency for a variable period of time dependent on an amount the interference value is above the select threshold.

2. The method of claim 1, wherein the determining step measures received signal strength for each of the radio frequencies.

3. The method of claim 1 wherein the determining step determines an interference level only for idle radio frequencies.

4. The method of claim 1 further comprising the step of filtering the interference values.

5. The method of claim 4 wherein the filtering step determines fast and slow filtered values using respective short and long time constants.

6. The method of claim 5 wherein the abandoning step comprises abandoning radio frequencies having fast filtered interference values above the select threshold.

7. The method of claim 5 wherein the selecting step selects remaining radio frequencies having lowest slow filtered interference values as allocated frequencies.

8. The method of claim 1 wherein the time period is lengthened if the interference value remains above the select threshold after the radio frequency is abandoned.

9. The method of claim 1 wherein the selecting step replaces allocated frequencies with other usable radio frequencies only if the interference value for the allocated frequency is above an acceptable interference threshold.

10. The method of claim 1 wherein the selecting step replaces allocated frequencies only with other usable radio frequencies having lower interference values.

11. A method for automatically allocating which of available radio frequencies are to be used as a pooled resource for wireless communications in a wireless office system having a plurality of transceivers using the pooled frequencies, the method comprising the steps of:

determining an interference level for each available radio frequency;

abandoning any radio frequency having an interference level above a select threshold;

selecting remaining usable radio frequencies having the lowest interference levels as allocated frequencies to be used in any of the plurality of transceivers in the wireless office system; and     designating select ones of the allocated frequencies as candidates for use as control channel frequencies in the wireless office system and periodically rotating a serving control channel from the candidates.

12. The method of claim 11 wherein the candidates are selected from the allocated frequencies having the lowest interference values.

13. The method of claim 11 wherein the serving control channel is rotated in a round robin manner.

14. An automatic frequency allocation system in a wireless office system, compromising:

measurement means for determining an interference level for each of a plurality of available radio frequencies;

a plurality of transceivers for communicating with mobile stations using any allocated radio frequencies;

a frequency allocator operatively connected to the measurement means and the plurality of transceivers and including first logic means for abandoning any radio frequency having an interference level above a select threshold, and second logic means for selecting remaining usable radio frequencies having lowest interference levels as allocated radio frequencies to be used as a pooled resource by any of the plurality of transceivers; and     wherein the first logic means abandons the radio frequency for a variable period of time dependent on an amount the interference value is above the select threshold.

15. The frequency allocation system of claim 14 wherein the measurement means measures received signal strength for each of the radio frequencies.

16. The frequency allocation system of claim 14 wherein the measurement means determines an interference level only for idle radio frequencies.

17. The frequency allocation system of claim 14 further comprising a filter for filtering the interference values.

18. The frequency allocation system of claim 17 wherein the filter determines fast and slow filtered values using respective short and long time constants.

19. The frequency allocation system of claim 18 wherein the first logic means abandons radio frequencies having fast filtered interference values above the select threshold.

20. The frequency allocation system of claim 18 wherein the second logic means selects remaining radio frequencies having lowest slow filtered interference values as allocated frequencies.

21. The frequency allocation system of claim 14 wherein the time period is lengthened if the interference value remains above the select threshold after the radio frequency is abandoned.

22. The frequency allocation system of claim 14 wherein the second logic means replaces allocated frequencies with other usable radio frequencies only if the interference value for the allocated frequency is above an acceptable interference threshold.

23. The frequency allocation system of claim 14 wherein the second logic means replaces allocated frequencies only with other usable radio frequencies having lower interference values.

24. An automatic frequency allocation system in a wireless office system, comprising:

measurement means for determining an interference level for each of a plurality of available radio frequencies;

a plurality of transceivers for communicating with mobile stations using any of allocated radio frequencies;

a frequency allocator operatively connected to the measurement means and the plurality of transceivers and including first logic means for abandoning any radio frequency having an interference level above a select threshold, and second logic means for selecting remaining usable radio frequencies having lowest interference levels as allocated radio frequencies to be used as a pooled resource by any of the plurality of transceivers; and     third logic means for designating select ones of the allocated frequencies as candidates for use as control channel frequencies and periodically rotating a serving control channel from the candidates.

25. The frequency allocation system of claim 24 wherein the candidates are selected from the allocated frequencies having the lowest interference values.

26. The frequency allocation system of claim 24 wherein the serving control channel is rotated in a round robin manner.

* * * * *